United States Patent [19]
Korzan

[11] Patent Number: 6,099,037
[45] Date of Patent: Aug. 8, 2000

[54] COLLAPSIBLE SHAFT HAVING TUNABLE COLLAPSE LOAD FOR MOTOR VEHICLE

[75] Inventor: William E. Korzan, Dearborn Heights, Mich.

[73] Assignee: The Torrington Company, Torrington, Conn.

[21] Appl. No.: 09/183,248

[22] Filed: Oct. 30, 1998

[51] Int. Cl.$^7$ ........................................................ B62D 1/11
[52] U.S. Cl. ........................................................ 280/777
[58] Field of Search .................................. 280/777, 776, 280/778, 779, 780

[56] References Cited

U.S. PATENT DOCUMENTS

| | | | |
|---|---|---|---|
| 5,235,734 | 8/1993 | DuRocher et al. | 29/455.1 |
| 5,348,345 | 9/1994 | Dykema et al. | 280/777 |
| 5,464,251 | 11/1995 | Castellon | 280/777 |
| 5,476,284 | 12/1995 | DuRocher et al. | 280/777 |
| 5,477,750 | 12/1995 | Korzan | 74/579 |
| 5,560,650 | 10/1996 | Woycik et al. | 280/777 |
| 5,575,501 | 11/1996 | Moriyama et al. | 280/777 |
| 5,634,662 | 6/1997 | Asayama | 280/777 |
| 5,669,270 | 9/1997 | Cymbal et al. | 74/493 |

*Primary Examiner*—Kevin Hurley
*Assistant Examiner*—Kevin McKinley
*Attorney, Agent, or Firm*—Robert F. Palermo

[57] ABSTRACT

A collapsible shaft, for a steering column of a motor vehicle, having a predetermined collapse load, includes an inner shaft member having a non-circular cross-section and an outer tube member having a non-circular cross-section congruent with that of the inner shaft member and slidably overlaying the inner shaft member. This shaft arrangement provides for yieldably retaining the inner shaft in a fixed axial position in the outer tube until acted upon by a predetermined force. The means for accomplishing this includes an undercut portion, having a length "L" and a depth "D", on one lateral face of the inner shaft, an arcuate spring member, having an arc length "L-ΔL", fitted into the undercut portion and, when the arcuate spring is compressed during insertion of the shaft into the tube, having its ends almost butted against the ends of the undercut portion and interfering with movement of the inner shaft in the outer tube. The spring member is stressed slightly beyond its elastic limit during insertion of the inner shaft and spring member into the outer tube.

2 Claims, 2 Drawing Sheets

COLLAPSIBLE SHAFT HAVING TUNABLE COLLAPSE LOAD FOR MOTOR VEHICLE

BACKGROUND OF THE INVENTION

This invention relates generally to motor vehicle steering columns and more particularly to such columns which include a temperature insensitive tunable collapse mechanism for energy management during collisions.

Collapsible steering columns have been provided on motor vehicles to reduce injury to operators during collisions. In virtually all such columns considerable effort has been directed to minimization of rotational lash between the telescoping components in order to provide a solid feel to the operator during steering maneuvers. Such efforts commonly employ inserts, either formed in place or added during assembly, of polymeric materials which provide damping of lash between the column components. Over time, however, due to repeated alternating stress on the inserts under varying temperature conditions, the inserts become loose and sensible lash is introduced to the steering column. This either requires replacement of column components or development of operator tolerance for a feel of loose steering.

In addition, the collapse of the column must provide sufficient resistance during collisions to provide controlled absorption of the energy generated by the possible impact of the operator with the steering wheel. For this purpose, many different energy absorbing mechanisms of varying merit have been developed including springs, levers, frangible or deformable tubes and shafts, friction couplings, and tearable strips. These must fit within the space provided between the steering wheel in the passenger compartment and the steering gear box in the engine compartment. The more complex the mechanism for energy absorption, the more space it requires. Thus it is often required to locate the collapsible portion of the steering column in the engine compartment. This creates a life-limiting exposure of polymeric components of the column to temperature extremes exceeding 250 degrees Fahrenheit, and it results in reduced reliability of the energy absorption behavior and in reduced solidity of feel of the steering column.

The foregoing illustrates limitations known to exist in present collapsible energy absorbing steering columns. Thus, it would clearly be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a collapsible shaft assembly, for a steering column of a motor vehicle, having a predetermined collapse load, comprising an inner shaft member having a non-circular cross-section; an outer tube member having a non-circular cross-section congruent with that of said inner shaft and slidably overlaying said inner shaft member; and means for yieldably retaining said inner shaft member in a fixed axial position in said outer tube member until acted upon by a predetermined force, said means comprising an undercut portion, having a length "L", and a depth "D", on at least one lateral face of said inner shaft member, at least one arcuate spring member, having an arc length "L-ΔL", fitted into said at least one undercut portion and, when compressed during insertion of said shaft member into said tube member, having its ends almost butted against the ends of the undercut portion and interfering, to a predetermined degree, with movement of said inner shaft member in said outer tube member.

The foregoing and other aspects will become apparent from the following detailed description of the invention when considered in conjunction with the accompanying drawings, in which like numbering is used to indicate the same object in all Figures.

DETAILED DESCRIPTION

Figure 1:
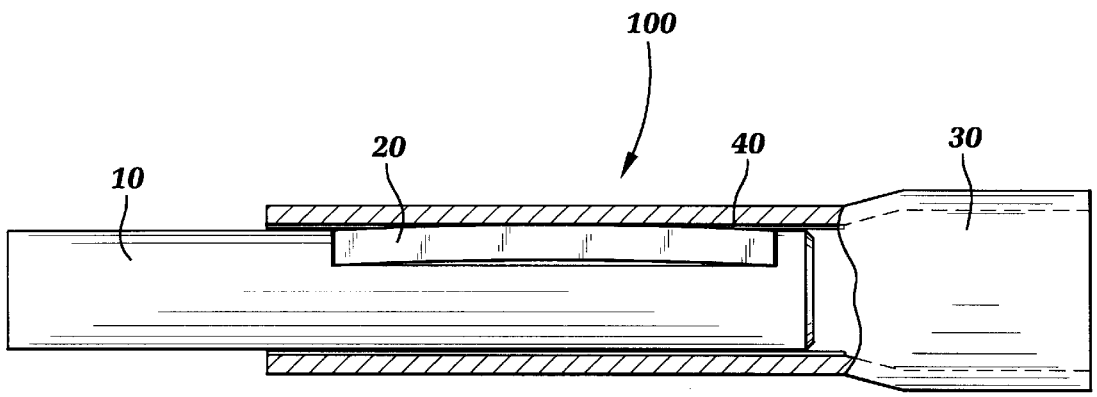
FIG. 1 is fragmentary longitudinal partially sectional view of a collapsible shaft assembly according to the invention.

FIG. 1 shows a partially cut-away, partially sectioned, longitudinal view of a collapsible shaft assembly 100 for a steering column according to the invention. It comprises an inner double-D shaft member 10, shaped to be congruent with an outer tube member 30 and to slidably fit within the tube member. All Figures should be considered, as needed for illustration of individual features of the components, in understanding the novel combinations of the inventions.

Figure 2A:
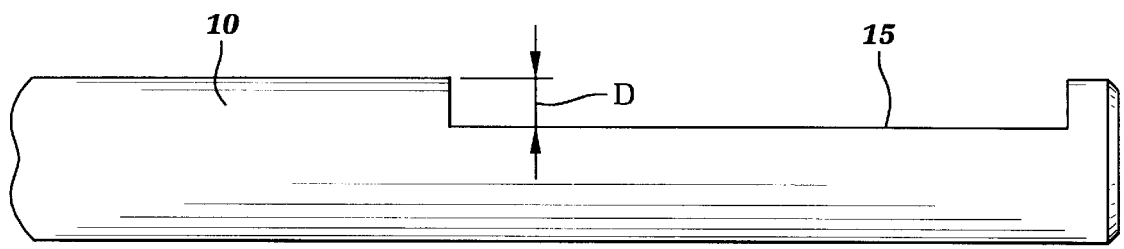
FIGS. 2a and 2b are longitudinal side and top views, respectively, of an undercut portion of the inner shaft member.
Figure 2B:
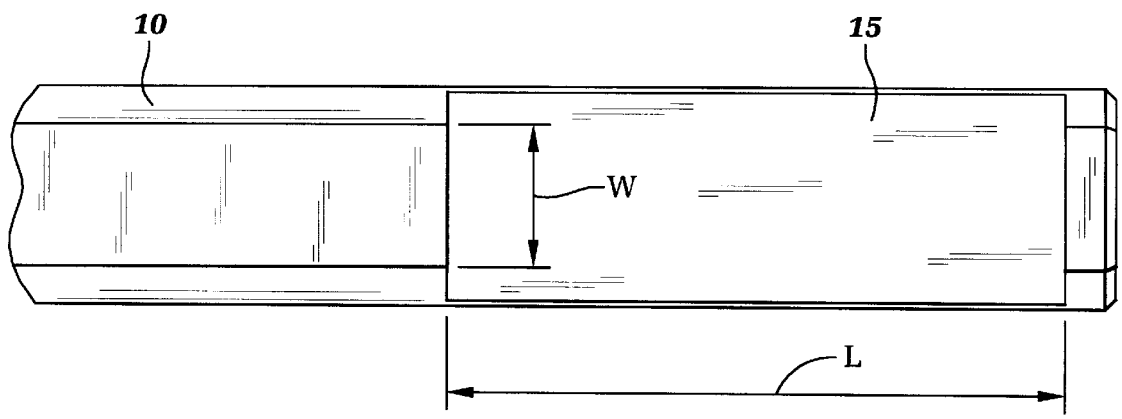

An undercut portion 15 of the shaft member 10 has a length "L" and a depth "D", as seen in FIG. 2, to accept a spring member 20, which has a length "L-ΔL" and a thickness less than or equal to the depth of the undercut portion 15 (≦"D"). Note that two oppositely situated undercut portions (not illustrated) could be provided to receive two spring members. It is however preferred to use only one, to simplify handling during assembly. The inner shaft member 10 is made from a substantially cylindrical workpiece with a radius "r" and formed to have two diametrically opposed, flat, axially extending surfaces to provide the non-cylindrical shape necessary for torque transmission between the shaft and the outer tube 30. The flat surfaces have a width "W", and at least one undercut portion 15, also flat, is located on at least one of the opposed flat surfaces.

Figure 4A:
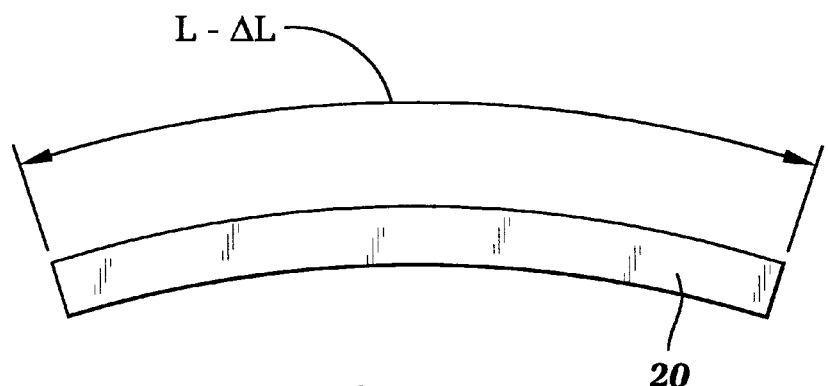
FIGS. 4a and 4b are side and top views, respectively of the spring member.

When placed in the undercut portion 15 of the shaft member 10, the spring member is in an arcuate configuration, as shown in FIG. 4a. Due to the necessity to radially compress the spring in order to fit it between the outer tube member and the undercut 15 of the shaft, the spring member is flattened and lengthened until its ends are almost butted against the ends of the undercut. When inserting the shaft member 10, with the installed arcuate spring member 20, into the outer tube member 30, the spring must be deformed to a substantially flat condition as shown in FIG. 1. This deformation provides the transverse force needed to grip against the outer tube 30 in order to provide the required energy absorption during collapse of the shaft assembly 100.

By properly sizing and hardening the spring member, the required compressive flattening of the spring member 20 will be slightly greater than the bending elastic limit for the material from which the spring is formed. Changes of the thickness of the spring result in increases or decreases in the load at which plastic flow of the spring material begins and, thus provide a means for tuning the grip of the spring against the tube. This stress to slightly above the elastic limit results in very accurate and reproducible collapse-load bearing capability for the shaft assembly 100. The preferred material is steel; because it is easily hardened to a consistent hardness level and because it resists deterioration due to the high temperatures and solvent vapors encountered within the engine compartment of the vehicle. Such temperatures often exceed the service limits for most polymers in mechanical applications, and when combined with chemical attack by the solvent vapors often lead to early failure. Since, for steel, stress (load) is directly proportional to strain (compression) by a factor of approximately 30,000,000 pounds per square inch, a very slight increase of strain causes a very large increase of stress. At the elastic limit (yield point), plastic flow begins, and there is a very large reduction in the stress/strain proportionality constant. In properly prepared spring members, the elastic limits are very narrowly dispersed; therefore, by controlling thickness of the springs, families of spring members 20 can be prepared with elastic load limits substantially tailored (tuned) to the service requirements of the steering columns for which they are intended. The result is a tunable energy absorbing member which can be specifically chosen for the anticipated severity of service.

A film of lubricant 40 is provided between the wall of the outer tube member 30 and the spring member 20, in order to prevent cold welding of the tube and spring members and to maintain a relatively constant frictional grip between them.

Figure 3:
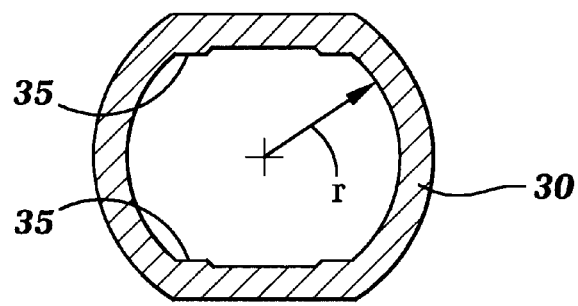
FIG. 3 is a transverse sectional view of the outer tube member of the collapsible shaft assembly.

The double-D shape of the outer tube member 30, which is congruent with the uncut portion of the inner shaft 10, is seen in FIG. 3. The laterally opposed portions of the tube 30 are arc segments having internal radii "r". They extend between two diametrically opposed flat segments having widths "W". This form provides torque transmission between the shaft and tube members 10, 30. At each corner of the tube member 30, there is an axially extending raised pad 35 which prevents rocking of the shaft member 10 within the tube member. These pads lie along the tube member 30 and contact the edges of the spring member 20 to reduce the possibility of rocking of the tube member on the shaft member 10.

Figure 4B:
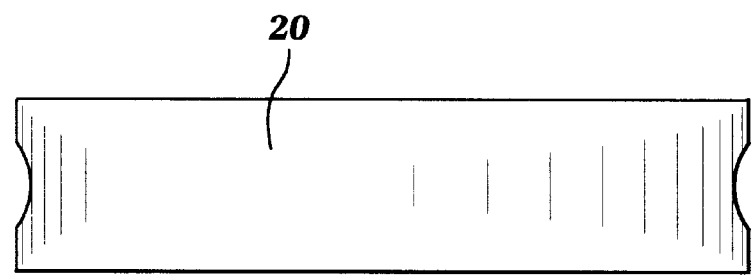

FIGS. 4a and 4b are side and top views, respectively, of the spring member in a relaxed state. In the relaxed state the spring member assumes an arcuate form. When installed in the undercut 15 of the inner shaft member 10 and inserted into the outer tube 30, the spring member 20 is subjected to bending stress sufficient to slightly exceed its elastic limit and is flattened until its ends are almost in contact with the ends of the undercut 15, as is seen in FIG. 1.

Having described the invention, I claim:

1. A collapsible shaft, for a steering column of a motor vehicle, having a predetermined collapse load, said collapsible shaft including an inner shaft member having a non-circular cross-section and an outer tube member having a non-circular cross-section congruent with that of said inner shaft member and slidably overlaying said inner shaft, comprising:

means for yieldably retaining said inner shaft member in a fixed axial position in said outer tube member until acted upon by a predetermined force, said means comprising an undercut portion, having a length "L" and a depth "D", on at least one lateral face of said inner shaft member, at least one arcuate spring member, having an arc length substantially equal to "L", fitted into said at least one undercut portion such that the arc of said spring member projects sufficiently beyond the flat face of said inner shaft member that, when compressed during insertion of said inner shaft into said outer tube member, said spring member is stressed slightly above its elastic limit and has its ends substantially butted against the ends of the undercut portion and interferes, to a predetermined degree, with movement of said inner shaft member in said outer tube member.

2. The collapsible shaft of claim 1, further comprising:

a coating of lubricant on at least one of said spring member, said inner shaft member, and said outer tube member to prevent cold welding between said members.

* * * * *